United States Patent [19]
Shawl et al.

[11] Patent Number: 5,139,204
[45] Date of Patent: Aug. 18, 1992

[54] METHOD FOR RECOVERING HAZARDOUS WASTE MATERIAL

[75] Inventors: Ronald C. Shawl, Fremont, Ohio; Francis W. Holm, Hinsdale; Albert G. Plys, So. Holland, both of Ill.

[73] Assignee: Chemical Waste Management, Inc., Oak Brook, Ill.

[21] Appl. No.: 595,542

[22] Filed: Oct. 11, 1990

[51] Int. Cl.⁵ .................................................. B02C 19/12
[52] U.S. Cl. .................................. 241/21; 241/DIG. 38
[58] Field of Search ...................... 241/DIG. 38, 46.17, 241/21, 24, 46.02

[56] References Cited

U.S. PATENT DOCUMENTS

| | | | |
|---|---|---|---|
| 3,549,092 | 12/1970 | Baxter | 241/46.17 X |
| 3,713,574 | 1/1973 | Blakley et al. | 241/46.17 X |
| 3,788,568 | 1/1974 | Marsh | 241/46.17 X |
| 4,032,446 | 6/1977 | Miller | 241/DIG. 38 X |
| 4,284,514 | 8/1981 | Wright | 241/DIG. 38 X |
| 4,679,738 | 7/1987 | Prisco et al. | 241/DIG. 38 X |
| 4,735,368 | 4/1988 | Janko et al. | 241/DIG. 38 X |
| 5,071,075 | 12/1991 | Wiens | 241/DIG. 38 X |

FOREIGN PATENT DOCUMENTS

WO82/03112  9/1982  PCT Int'l Appl. .
1485448  9/1977  United Kingdom ....... 241/DIG. 14

Primary Examiner—P. W. Echols
Attorney, Agent, or Firm—Allegretti & Witcoff, Ltd.

[57] ABSTRACT

An apparatus and process for removing waste material from a container and for separating the waste material into a pumpable slurry fraction and a solids fraction, the apparatus comprising a mechanical means for removing waste material from the container, and a waste pulper for receiving the waste material and for grinding and separating the waste material into at least a pumpable slurry fraction and a solids fraction.

2 Claims, 3 Drawing Sheets

METHOD FOR RECOVERING HAZARDOUS WASTE MATERIAL

BACKGROUND OF THE INVENTION (1) Field of the Invention

This invention concerns the removal, separation and recovery of waste material stored in a container, and especially waste material stored in industrial drums. More specifically, the bottoms of the containers are removed and the contents of the containers are emptied in a waste pulper that both grinds the waste material and separates the waste material into a pumpable liquid fraction and a solids fraction.

(2) Description of the Art

The art discloses methods and apparatus for separating waste material held in drums. The art also discloses the use of a pulper to grind specific types of grindable materials.

U.S. Pat. No. 4,735,368 discloses an apparatus for recovering liquid and solid fractions from waste materials held in industrial drums. The waste material is dropped into a sorter in which solid or large pieces of waste are separated from the liquid/sludge portion of the waste by a screen type separation.

A waste pulper known as a Hydrapulper, manufactured by Black Clawson located at Middletown, OH has been used for many years in the paper industry to defiber wood pulp. It has also been used for tar sand processing. Hydrapulper literature from Black Clawson indicates that the apparatus may be used in applications besides pulping. Possible applications disclosed include chemicals, rendering and agricultural residues.

U.S. Pat. No. 4,055,480 described the use of a waste pulper similar to those used in the lumber industry to reduce the size of tar sand pieces.

The art does not disclose nor does it suggest the concept of combining a mechanical container emptying apparatus with a waste pulper similar to those used in the lumber industry to recover and separate waste materials held in containers.

SUMMARY OF THE INVENTION

It is an object of this invention to provide a waste treatment apparatus and process for separating components of a waste material held in a container that is capable of separating and recovering a wide range of liquid and solid waste material.

It is another object of this invention to provide a waste treatment apparatus and process for separating components of a waste material held in a container in which the viscosity of the liquid fraction recovered in the separation section of the apparatus is controlled.

It is yet another object of this invention to provide a waste treatment apparatus and process for separating components of a waste material held in a container in which the size of the solid components of the waste material is reduced such that a portion or all of the solid component becomes emulsified in the liquid fraction, which is then recovered.

This invention relates generally to a waste treatment apparatus for separating components of a waste material comprising a liquid waste component and a solid waste component held in a container. The apparatus comprises a mechanical removal apparatus for removing waste material from the container. The apparatus also comprises a waste pulper for receiving the waste material that is removed from the container. The waste material is separated in the waste pulper into a solid waste fraction and a liquid waste fraction. The waste pulper is further capable of liquefying a portion or all of the solid component of the waste material.

In another embodiment, this invention is a waste treatment apparatus for grinding and separating components of a waste material held in metal drums having a top and bottom dimension into fractions including a solid waste fraction and a liquid waste fraction. The apparatus comprises a mechanical removal apparatus for removing waste material from metal drums. The removal apparatus for removing waste material comprising a liquid waste component and a solid waste component from metal drums includes a first conveyor for conveying metal drums containing waste material; a purging chamber for receiving said metal drums from the first conveyor, said purging chamber having in inlet door and an outlet door; a second conveyor within the purging chamber for conveying metal drums from the purging chamber; a third conveyor outside said purging chamber for conveying metal drums to an opener to thereby open the bottom dimension of the metal drum; and an extractor for forcing the waste material out of the open bottom dimension of the metal drum and into the waste pulper. The second and third conveyors may be the same or different. The waste pulper receives the waste material that is emptied from the container. The waste material is separated into fractions comprising a solid waste fraction and a liquid waste fraction in the waste pulper. The liquid level of the waste pulper is controlled. Additionally, the waste pulper has a secondary liquid inlet that is connected to a secondary liquid source by a secondary liquid conduit. The viscosity of the liquid waste fraction is controlled by controlling the flow of secondary liquid to the waste pulper.

In yet another embodiment, this invention is a process for recovering waste material from a container having a top dimension and a bottom dimension and thereafter separating the waste material into fractions including a solid waste fraction and a liquid waste fraction. The process comprises the steps of removing waste material comprising a solid waste component and a liquid waste component from the bottom dimension of a container and directing the waste material into a waste pulper. The waste material is separated in the waste pulper into fractions including a solid waste fraction and a liquid waste fraction. The waste pulper is capable of reducing the size and volume of the solid waste component of the waste material to such an extent that the solid waste fraction is smaller in volume and in weight than the solid waste component of the waste material.

In an additional embodiment, this invention is a process for recovering waste material. The process includes the steps of removing waste material comprising a solid component and a liquid component from a metal drum having a top and bottom dimension. The waste material is removed from the metal drum by conveying the metal drum into a purging chamber to define a drum containing purging chamber. The drum in the drum containing purging chamber is purged with nitrogen to define a purged drum. The purged drum is then conveyed from the purging chamber to a drum opener to open the bottom dimension of the drum thereby defining an open purged drum. The waste material in the open purged drum is removed with a crusher/extractor to produce a crushed drum and extracted waste material. The extracted waste material is directed to the waste pulper. The extracted waste material is separated in the waste pulper into fractions including a solid waste fraction and a liquid waste fraction. The liquid waste fraction is directed to a tank through a liquid waste fraction conduit when the liquid level in the waste pulper exceeds a predetermined level. A secondary liquid is supplied to the waste pulper during the separation step to maintain the viscosity of the liquid waste fraction at a predetermined level.

BRIEF DESCRIPTION OF THE DRAWINGS

Shown in the attached figures are the presently preferred embodiment of the process and apparatus of this invention wherein like numbers and various figures refer to like elements and wherein.

DESCRIPTION OF THE PREFERRED EMBODIMENTS

The present invention is an apparatus and process for separating components of a waste material comprising of a liquid waste material and a solid waste material held in a container into fractions including a solid waste fraction and a liquid waste fraction.

Figure 1:
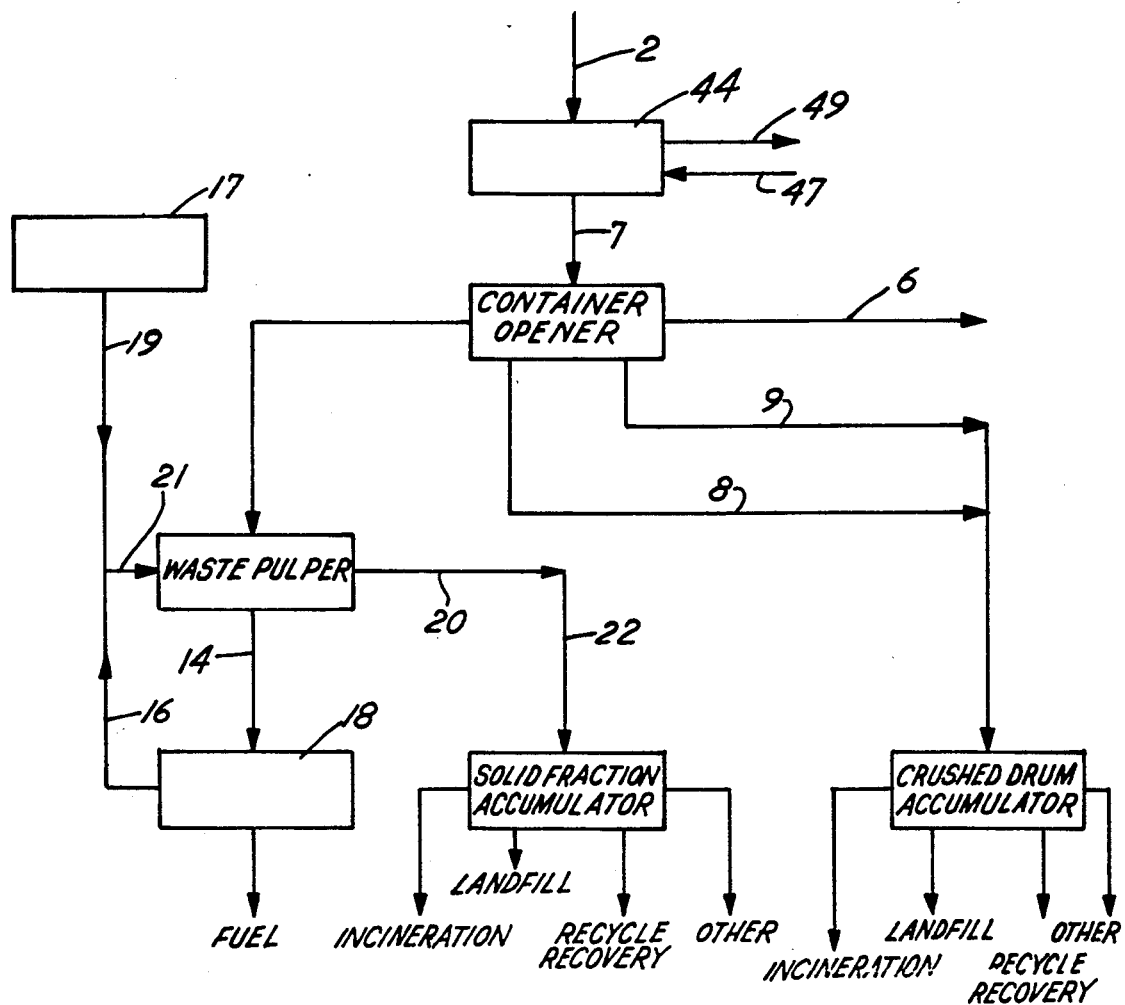
FIG. 1 shows a flow diagram of a preferred process.

The invention is first explained with reference to the figures. FIG. 1 is directed towards a process for recovering waste material comprising a solid component and a liquid component from a metal drum. However, the process description is not intended to limit the scope of the invention to one for recovering waste material from metal drums. Almost any container holding waste material can be processed as described below.

The process begins with metal drums from a wasate containing metal drum supply 2, being conveyed to a purging chamber 44. The purging chamber 44 includes a gas inlet 47 for supplying a purging gas to the purging chamber 44 and a gas outlet 49 for removing gases from the purging chamber 44. The purged drums 7 are directed to a container opener via a metal drum conveyor. Purged drums 7 are transported to the container opener one at a time. The container opener typically shears off all or a portion of the bottom dimension of the purged drum 7 to produce an open drum and drum lids 9. Thereafter the waste material stream 10 emptying from the purged drum 7 is directed into the waste pulper. In the container opener area, opened, purged drum 7 is also crushed to insure that the liquid waste component and solid waste component of the waste material contained in the drum is directed to the waste pulper by way of the waste material stream 10. Crushed drums 8 produced by the container opener are directed along with the drum lids 9 to a crushed drum accumulator. Preferably drums are crushed to such an extent that they are RCRA empty i.e., that they comply with the definition located at 40 CFR Section 261.7 which states that a container that has held hazardous waste is empty if all wastes in the container have been removed and no more than 2.5 centimeters of residue remain on the bottom of the container or no more than 2 percent by weight of the total capacity of the container remains in the container. Occasionally, the container opener encounters a drum that cannot be crushed. These noncrushable drums 6 are directed away from the container opener for separate processing.

The liquid waste material stream 10 enters the waste pulper where it is processed and separated into a solid waste fraction 20 and a liquid waste fraction 14. The total solid fraction 22 is directed into a solid fraction accumulator. When the solid fraction accumulator becomes full, the solid fraction 22 can be directed to an incinerator, to a landfill, to a container, to a material recycle/recovery process or to any other means for processing hazardous wastes. The liquid waste fraction 14 separated from the liquid waste material stream 10 by the waste pulper is directed to liquid waste fraction storage tanks 18. A secondary liquid stream 16 may originate from the liquid waste fraction storage tanks 18. The purpose of the total secondary liquid stream 21 is to control the viscosity of the liquid fraction 14 produced by the waste pulper. The materials accumulated in the liquid waste fraction storage tanks 18 are eventually used as industrial waste derived fuel in applications such as cement kilns.

As mentioned above, the crushed drums 8 and drum lids 9 are directed to a crushed drum accumulator. When the crushed drum accumulator contains a sufficient volume of crushed drums 8, and drum lids 9, the contents of the crushed drum accumulator are directed to the incineration, landfill, container recovery and or recycle, or to other means for processing hazardous wastes.

Figure 2:
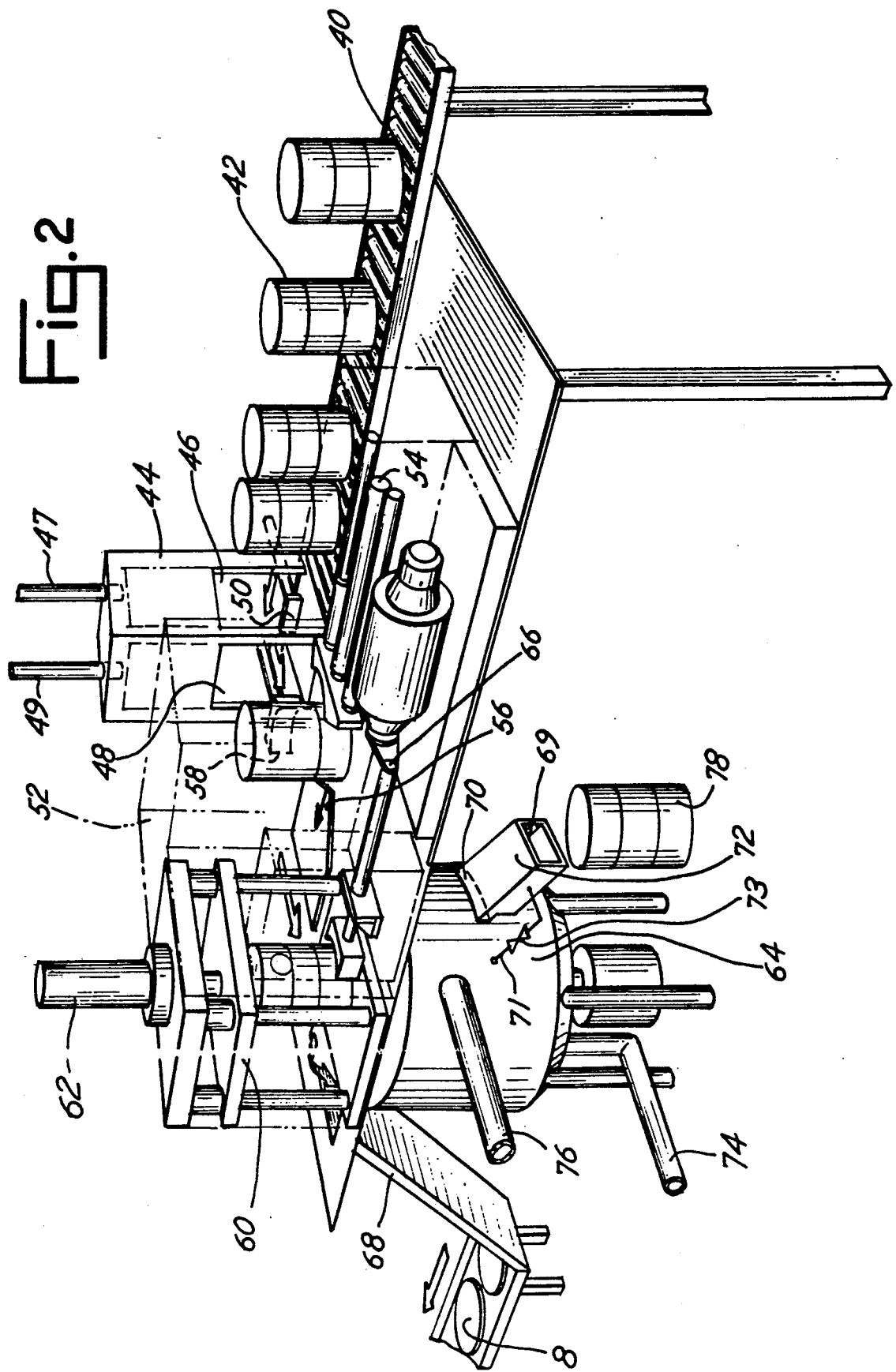
FIG. 2 shows a perspective view of a preferred process and apparatus.

FIG. 2 shows a perspective view of the process and apparatus for recovering waste material from a container. The apparatus comprises a first conveyor 40 that conveys a metal drum 42 to a purging chamber 44. The purging chamber 44 has an inlet door 46 and an outlet door 48 as well as a gas inlet 47 and a gas outlet 49. The purging chamber 44 now containing drum 42 is purged with nitrogen supplied by the gas inlet 47 in purging chamber 44. Purge gas is removed from the purging chamber 44 by the gas outlet 49. Thereafter, the metal drum 42 is conveyed through the outlet door 48 of the purging chamber 44 by a second conveyor 50 that is located within purging chamber 44. At this point the drum 42 may be located in an intermediate purged chamber 52 depending on the number and type of conveyors used in the apparatus. The intermediate purged chamber 52 houses the drum opener and the drum extractor 60. The drum 42 located in the intermediate purged chamber 52 is conveyed by a third conveyor 54 to a shear blade 56. The shear blade 56 slices or cuts open at least a significant portion of the bottom dimension of the metal drum 42. The second conveyor 50 and third conveyor 54 may be the same or different. Alternatively, the shear blade 56 may be vertical acting rather than horizontal, and may be circular rather than flat. In fact, the shear blade 64 may take on any shape capable of significantly opening at least a portion of the bottom dimension of the metal drum 42.

At this point the metal drum 42 with a sheared bottom dimension may be located over the waste pulper 64 or can be conveyed, as in FIG. 2, by a fourth conveyor 58 into the extractor 60 located above the waste pulper 64. The extractor 60 includes a ram 62 that acts to crush drum 42 thereby extruding the unemptied contents of the drum into waste pulper 64. The ram 62 is then raised off crushed drum 8 and a fifth conveyor 66 conveys crushed drum 8 to chute 68. Chute 68 directs crushed drums 8 to a crushed drum accumulator.

The waste material that is removed from the metal drum 42 is directed to waste pulper 64. The waste material typically comprises a solid waste component and a liquid waste component. The waste pulper 64 chops and blends the waste material to produce a liquid waste fraction and a solid waste fraction. The liquid waste fraction leaves the waste pulper 64 through a liquid waste fraction conduit 74. The waste pulper 64 also accepts a total secondary liquid stream that enters the waste pulper 64 through secondary liquid conduit 76.

The solid waste fraction is intermittently directed through first gate valve 70 and into an basket strainer 72 that acts as the total solid fraction accumulator for the process. Liquid waste fraction material that accumulates in basket strainer 72 is returned to waste pulper 64 via liquid waste fraction return line 71. By activating valve 73 when the basket strainer 72 is emptied of liquid, valve 73 is closed and second gate valve 69 is opened and all of the solid waste fraction in basket strainer 72 falls into the total solid fraction accumulator 78.

Figure 3:
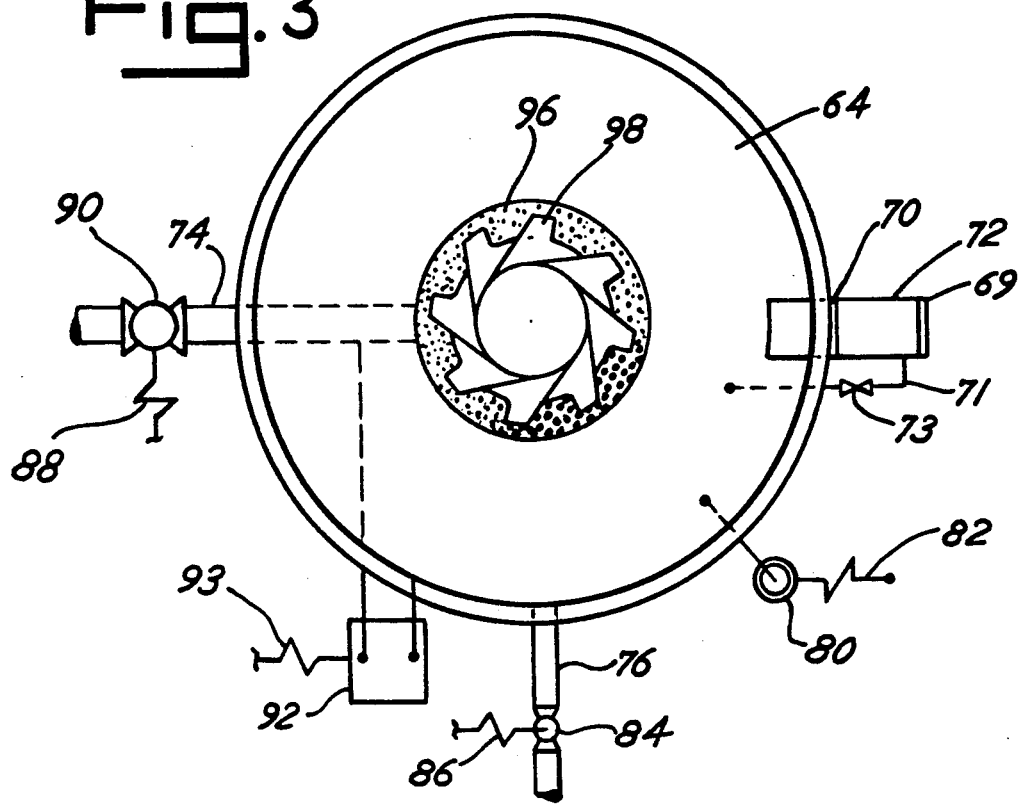
FIG. 3 shows a top and front view of a preferred waste pulper.
Figure 4:
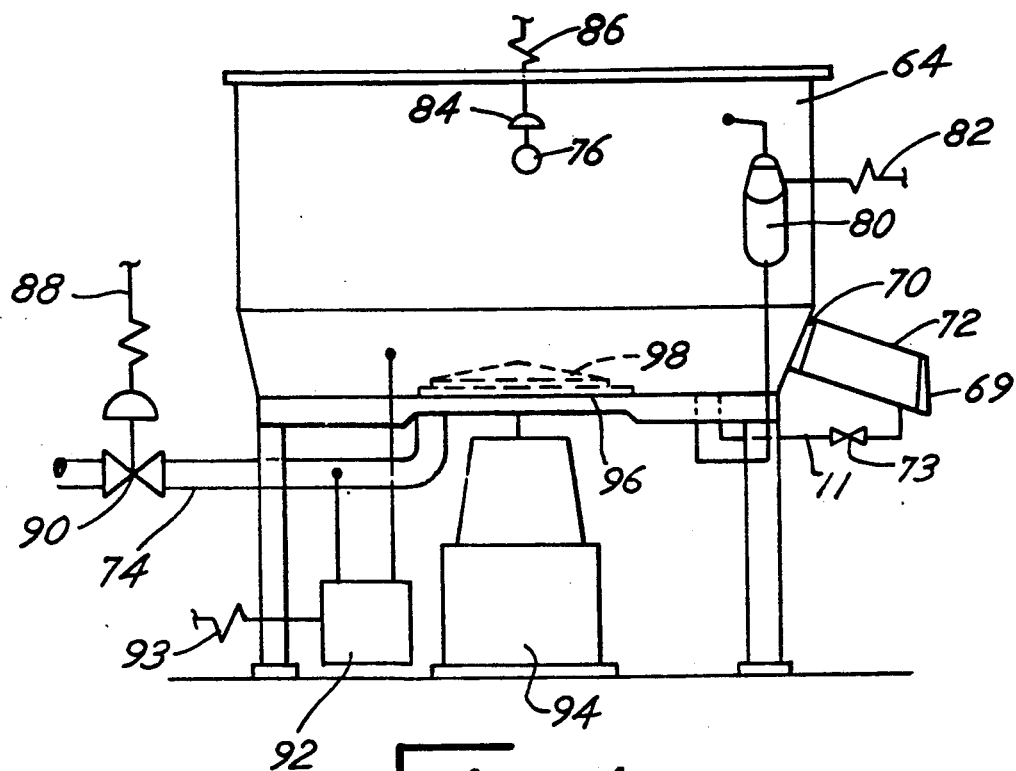

FIG. 3 is a top and front view of the preferred waste pulper 64. The waste pulper 64 includes a rotating blade 98 located in the bottom dimension of the waste pulper 64. The rotating blade 98 is attached to motor 94 which drives rotating blade 98. The rotating blade 98 grinds, mixes and emulsifies the liquid and solid components of waste material which has been emptied into waste pulper 64.

The liquid waste fraction of the waste material separated by the waste pulper 64 passes through screen 96 and into liquid waste fraction conduit 74. The flow of the liquid waste fraction through the liquid waste fraction conduit 74 is controlled by liquid level sensor 80. Liquid level sensor 80 senses the liquid level in waste pulper 64 and sends an electronic liquid level signal 82 a to liquid level control device. The liquid level control device sends a first control valve signal 88 that opens, maintains or closes the liquid waste fraction control valve 90 thereby maintaining the liquid level in waste pulper 64 at a predetermined value.

Secondary liquid is directed to the waste pulper by secondary liquid conduit 76. The flow of secondary liquid to waste pulper 64 is varied to maintain the viscosity of the liquid waste fraction at a predetermined value. A viscosity measuring device 92 measure the viscosity of the liquid material in waste pulper 64. The viscosity measuring device 92 then sends an electric viscosity signal 93 to a viscosity control device. The viscosity control device then sends a second control valve signal 86 that opens, maintains or closes the secondary liquid control valve 84 thereby maintaining the viscosity of the liquid waste material in waste pulper 64 at a predetermined value.

The solid waste fraction is inermittently removed from waste 64 by opening frist gate valve 70. First gate valve 70 directs the solid waste fraction and some liquid waste fraction into a basket strainer 72. When the basket strainer 72 is full, first gate valve 70 is closed. Liquid waste fraction material that accumulates in basket strainer 72 is returned to waste pulper 64 via liquid waste fraction return line 71. By activating valve 73, basket strainer 72 is emptied of liquid while the inert atmosphere of waste pulper 64 is maintained. When basket 72 is emptied of liquid, valve 73 is closed and second gate valve 69 is opened. When gate valve 69 is opened, the solid waste fraction in the basket strainer 72 falls into the a total solid fraction accumulator. Second gate valve 9 is then closed, and the process is repeated.

This invention is a waste treatment apparatus and process for separating components of a waste material held in a container. The waste material that is processed in this invention typically comprises a liquid waste component and solid waste component. Solid waste components would include actual solid materials such as metals, plastics, fabric, rocks and similar nonliquid articles and sludge material that, while being somewhat liquid in nature, does not have the flow properties of a liquid. Typically containers are separated into six categories. A category 1 container contains 100% liquid. A category 2 containers contains 75% liquid and 25% sludge and solids material. The category 3 container contains a mixture of 50% liquid and 50% sludge while a category 4 container contains 25% liquid and 75% sludge. A category 5 container contains all sludge and solids with less than 2 inches of conventional liquid on the top of the container. A category 6 container contains no liquid at all and only sludge material and/or solid material. The category of a container is determined by an operator visibly examining a core sample taken from the contents of each container to be processed.

The process and apparatus of this invention is capable of accepting waste material from any type of container that can be opened and emptied into the waste pulper of this invention. This would include for example plastic jugs, large mouth plastic bottles, small and large plastic and metal drums and any other container that can be opened and emptied. It is preferred that the container utilized in this invention is a metal or plastic drum with industrial size, metal 55 gallon drums being most preferred.

In the apparatus, containers containing waste material are conveyed by a first conveyor into a purging chamber. The purging chamber has an inlet door and an outlet door. Preferably the inlet door and outlet door are covered by plastic sheets or are actual openable and closeable doors. The purpose of the purging chamber is to surround the container with an inert gas such as, for example, nitrogen, helium or carbon dioxide. By purging the air surrounding the container with an inert gas, the likelihood of the waste material in the container igniting is significantly reduced.

Once the container is purged in the purging chamber, a second conveyor moves the container through the outlet door of the purging chamber and typically into an intermediate chamber. The intermediate chamber surrounds the container opener, the container extractor and also the waste pulper. The intermediate chamber has an inert gas atmosphere, like the purging chamber, as a fire precaution. It is not necessary in all instances that waste drums be purged. If the waste material is aqueous then fire may not be a problem and container purging might not be necessary. Additionally, the apparatus of this invention would not have an intermediate chamber if the second conveyor conveyed the container past an opener and directly to the container extractor.

The container, which is located outside of the purging chamber, is now is position to be opened. A container opener is used to open the container. The container opener will vary depending upon the type of container to be opened. If the container has a cap or lid, the preferred container opener may of the type that removes the lid from the container. In the case of the preferred metal drums, the container opener is a shear blade. A metal drum is opened by conveying the drum to or across the shear blade with a second or third conveyor. The shear blade cuts off at least a portion of the bottom dimension of the metal drum, which typically has both a top and bottom dimension.

At this point, the bottom dimension of the container may be located directly over the waste pulper, or the drum can be moved by a fourth conveyor into a position directly over the waste pulper. Whichever method is used, it is preferable to remove the bottom dimension of the drum in a location such that any waste material that flows from the open container is directed into the waste pulper.

In many cases, the container includes materials that do not flow by gravity into the waste pulper. Such materials include, for example, sludge and solid waste materials. Therefore, the apparatus includes an extractor for forcing any remaining waste in an opened container into the waste pulper. Such extractors might include, for example, agitators for shaking the contents out of the container, use of solvents to remove the contents of the container, or in the case of the preferred metal drums, a drum crusher.

When the contents of metal drums are emptied into the waste pulper, the emptying process is promoted by an extractor comprising a drum crusher. The drum crusher is typically a hydraulic ram type mechanism that crushers the drum preferably from the top dimension towards the opened bottom dimension thereby extruding any waste materials remaining in the drum into the waste pulper. Crushing the drums has two advantages. Any waste material remaining in the drum is forced into the waste pulper by the crushing process. Additionally, the drums are reduced in size to a height of a few inches thereby greatly reducing the volume of drums to be disposed of.

The crushed drums and the sheared bottom dimension of the preferred drums typically drum lids, are collected for further processing or disposal. If metal containers are used, they may be incinerated, buried in a landfill, recycled for their metals recovered for reuse, or processed by any means known in the art for processing hazardous waste material. For example, the container may be washed or decontaminated before disposal or incantation. If plastic or glass containers are used, they may be cleaned and reused, recycled, or buried in landfills.

A preferred embodiment of the drum conveying, opening, and emptying portion of the apparatus of this invention is described in U.S. Pat. No. 4,735,368, which is incorporated herein by reference.

The waste material that is removed from the containers is directed into a waste pulper. The waste receives the waste material that is removed from the container and separates the waste material into fractions including a solid waste fraction and a liquid waste fraction. The solid waste fraction typically comprises materials such as metals, glass, rocks and any other solid materials that are not easily reduced in size by the waste pulper. The liquid waste fraction will comprise the liquid material from the drums and additionally most if not all of the slurry material contained in the drums as well as a portion or all of the solid material, if any, that was contained in the drums.

The waste pulper is preferably a Hydrapulper manufactured by the Black Clawson Company. The Hydrapulper comprises rotating blades in a vessel. The waste material that is emptied into the Hydrapulper is contacted by the rotating blades, which grind, mix and emulsify the waste material. The liquid waste fraction in the Hydrapulper passes through holes in a screen below the rotating blades. This material is then directed to tankage. The solid waste fraction includes any materials that cannot pass through the screens.

The solid waste material is typically allowed to accumulate in the waste pulper and is removed by opening a first gate valve in the side of the waste pulper. Opening the first gate valve allows the solid waste fraction to be captured in a vessel containing metal screens. The first valve is closed, and any liquid waste fraction material is directed back to the waste pulper by opening up a valve on a liquid return line. When the valve is closed, a second gate valve is opened and the solid waste fraction is directed to a solid waste fraction accumulation, usually a hopper or drum. The frequency at which solid waste material is removed from the waste pulper through the first gate valve will depend upon the amount of solids in the waste material that is directed to the waste pulper. The solid waste material can be classified for recovering and recycling purposes, it can be buried in a landfill, it can be incinerated or it can undergo any waste material processing known to one in the art.

The waste pulper of this invention is capable of grinding up grindable materials such as plastics, fabrics, and small pieces of metal. Additionally, the waste pulper action adds typically sufficient energy to the waste material during the waste material separation step to allow the slurry portion of the waste material and ground solids to become emulsified along with the liquid waste component of the waste material to define the liquid waste fraction.

The waste pulper incudes a secondary liquid inlet. The secondary liquid is used to adjust the viscosity of the liquid waste fraction exiting the waste pulper. The secondary liquid may be any liquid capable of adjusting the viscosity of the liquid waste fraction exiting the waste pulper. The secondary liquid can be a liquid independent of the process, for example, light hydrocarbons such as solvents or water stored in independent liquid tanks. It is preferred that the total secondary liquid is comprised of a portion to all of liquid waste fraction material that has been separated by the waste and stored in tanks. If the total secondary liquid stream is partly made up of liquid waste fraction materials, then the remaining portion of the total secondary liquid stream will be an independent liquid. By using recovered liquid waste fraction material as a portion to all of the total secondary liquid, the viscosity of the liquid waste fraction exiting the waste pulper can be controlled without having to use large amounts of expensive, nonwaste materials. Exact viscosity of the liquid waste fraction exiting the waste pulper will vary depending upon the ultimate end use for the recovered liquid waste fraction. Typically, the liquid waste fraction is recovered for use as industrial waste derived fuel, for example, as fuel for cement kilns. Liquid waste fraction viscosity is controlled by directly measuring the viscosity of the liquid waste fraction exiting the waste pulper and increasing or decreasing the flow of secondary liquid into the waste pulper based upon the measured viscosity to control the liquid waste fraction viscosity at a predetermined value.

The liquid waste fraction flow rate from the Hydrapulper is controlled by a liquid level controller. The liquid level in the waste is continuously monitored and the liquid waste fraction contained in the waste pulper is directed to tankage when the liquid level in the waste pulper exceeds a predetermined level.

While the invention has been described in many instances in respect to a preferred embodiment thereof, it will be appreciated by those skilled in the art to which the invention pertains that numerous changes may be made in this system without departing from its spirit and scope.

What we claim is:

1. A process for recovering hazardous waste material comprising the steps of: removing hazardous waste material from a metal drum having a bottom dimension and a top dimension by the further steps of:
   i. conveying the metal drum into a purging chamber to define a metal drum containing purging chamber;
   ii purging the metal drum containing purging chamber with an inert gas to define a purge drum;
   iii opening at least a portion of the bottom dimension of the purged drum to define an open, purged drum;
   iv. transferring the liquid waste component of the hazardous waste material in the open purged drum into a waste pulper;
   v. extracting the remaining hazardous waste material from the bottom dimension of the open purged drum;
   separating the hazaradous waste material in the waste pulper into fractions including a solid waste fraction and a liquid waste fraction;
   measuring the viscosity of the liquid waste fraction;
   supplying secondary liquid to the waste pulper to adjust the viscosity of the liquid waste fraction;
   directing the liquid waste fraction to a liquid waste fraction storage tank when the liquid level in the waste pulper exceeds a predetermined level; and
   recovering the solid waste fraction from the waste pulper.

2. A process for recovering hazardous waste material as defined in claim 1 wherein the opened purged drum is landfilled, incinerated, or recycled.

* * * * *